United States Patent [19]

Kainthla et al.

[11] Patent Number: 5,419,986
[45] Date of Patent: May 30, 1995

[54] METHOD OF MAKING A RECHARGEABLE MANGANESE-OXIDE COMPOUND AND RELATED ELECTRODE MATERIAL

[75] Inventors: Ramesh C. Kainthla; David J. Manko, both of College Station; A. John Appleby, Bryan, all of Tex.

[73] Assignee: Rechargeable Battery Corporation, Bryan, Tex.

[21] Appl. No.: 137,577

[22] Filed: Oct. 15, 1993

[51] Int. Cl.6 .............................................. H01M 4/50
[52] U.S. Cl. .................................. 429/224; 423/50; 423/87; 423/599
[58] Field of Search .................. 429/224; 423/50, 87, 423/599

[56] References Cited

U.S. PATENT DOCUMENTS

| | | |
|---|---|---|
| 1,293,463 | 2/1919 | Kaplan . |
| 3,533,740 | 10/1970 | Grund et al. . |
| 3,535,217 | 10/1970 | Amano et al. . |
| 3,773,916 | 11/1973 | Preisler et al. . |
| 3,948,684 | 4/1976 | Armstrong . |
| 4,006,217 | 2/1977 | Faber et al. . |
| 4,048,027 | 9/1977 | Senderoff . |
| 4,072,586 | 2/1978 | DeNora et al. . |
| 4,133,856 | 1/1979 | Ikeda et al. . |
| 4,170,527 | 10/1979 | Beer et al. . |
| 4,269,691 | 5/1981 | Deborski . |
| 4,277,360 | 7/1981 | Mellors et al. . |
| 4,295,943 | 10/1981 | Tomov et al. . |
| 4,362,791 | 12/1982 | Keneko et al. . |
| 4,405,699 | 9/1983 | Kruger . |
| 4,451,543 | 5/1984 | Dzieciuch et al. . |
| 4,476,104 | 10/1984 | Mellors . |
| 4,520,005 | 5/1985 | Yao . |
| 4,728,586 | 3/1988 | Venkatesan et al. . |
| 4,863,817 | 9/1989 | Ogino et al. . |
| 5,156,934 | 10/1992 | Kainthla et al. . |
| 5,250,374 | 10/1993 | Zhang . |

FOREIGN PATENT DOCUMENTS

| | | |
|---|---|---|
| 0138316 | 4/1985 | European Pat. Off. . |
| 51-6821 | 1/1976 | Japan . |
| 52-41846 | 3/1977 | Japan . |
| 1466 | 1/1981 | Japan . |
| 1038463 | 8/1966 | United Kingdom . |

OTHER PUBLICATIONS

K. Kordesh, et al., Electrochemical Acta, 26, 1495 (1981). (Month N/A).
Wroblowa, et al., Journal of Electroanalytical Chemistry, 238, 93 (1987) (Month N/A).
Application serial No. 07/507980 Apr. 11, 1990 Appleby.

Primary Examiner—Stephen Kalafut
Attorney, Agent, or Firm—Arnold B. Silverman; Rita M. Rooney

[57] ABSTRACT

A method of making a rechargeable battery electrode material containing manganese oxide is provided. The method includes preparing an aqueous solution of manganese nitrate and dissolving bismuth nitrate into the solution. The mixture is heated to evaporate the water contained in the mixture and is further heated to facilitate decomposition of the nitrates in the mixture to form a compound containing manganese oxide and bismuth oxide. The compound is maintained at a temperature of between about 200 to 300 degrees Celsius for an additional 12 hours. Thereafter, the compound is cooled and ground to a desired particle size for use as a rechargeable battery electrode material. The compound may alto be mixed with commercially prepared electrolytic or chemical manganese dioxide to obtain a highly rechargeable battery electrode material. A related battery cell is also disclosed.

24 Claims, 4 Drawing Sheets

METHOD OF MAKING A RECHARGEABLE MANGANESE-OXIDE COMPOUND AND RELATED ELECTRODE MATERIAL

BACKGROUND OF THE INVENTION

1. Field of the Invention

This invention relates to a method of making a rechargeable manganese-oxide based compound and a related electrode material. The compound disclosed may be combined with suitable additional materials and components to form a positive electrode for a rechargeable battery cell. The compound of the present invention can also be used with commercially available electrode materials such as, for example, electrolytic manganese dioxide and when it is so used, the product of the present invention imparts rechargeability to the entire material.

2. Background of the Invention and Description of the Prior Art

Manganese dioxide has been used extensively in primary battery cells and particularly in dry and alkaline manganese dioxide-zinc cells. These battery cells are generally made in a charged state, are used once and are then discarded. Recently, in view of both expanding energy requirements and environmental concerns about proper waste disposal of used battery cells, great emphasis has been placed upon the development of readily rechargeable battery cells which can be used in a wide range of equipment and consumer products. Rechargeable batteries would be useful in many applications such as the electric vehicle and consumer electronic products. Examples of other areas particularly suited to the use of rechargeable batteries include satellites, space travel equipment and as backups for solar energy systems.

As noted hereinbefore, manganese dioxide has been widely used in primary battery cells. It is desirable to continue to use manganese dioxide in batteries because of its low cost and its stability. Further, unlike other rechargeable batteries, manganese-oxide/zinc batteries do not generally contain toxic components. The commonly used form of manganese dioxide itself is not readily rechargeable. Furthermore, rechargeability is essentially impossible if the material has been deep discharged to greater than 50 percent of the theoretical two-electron capacity.

Although it has been shown that in certain circumstances electrolytic manganese dioxide may be recharged in the range of 100 times, this is only true if the material is discharged to less than 30 percent of the theoretical one-electron capacity (which, as would be understood by one skilled in the art, is equivalent to less than 15 percent of the theoretical two-electron capacity.) Kordesch, et al. *Electrochemica. Acta,* 26, 1495 (1981). This is a restriction which requires shallow discharge and which severely limits the amount of energy which can be retrieved from the cell. It also reduces the rechargeability or eliminates rechargeability entirely if the manganese dioxide is accidentally discharged beyond the limit. Thus, there is very little practical application to the rechargeability.

Various attempts have been made at making a rechargeable compound containing manganese dioxide. For example, U.S. Pat. No. 4,250,005 discloses a chemical process to prepare a compound which includes manganese dioxide doped with bismuth and/or lead. The resulting compound is rechargeable, however, it has a lower density than is desirable in many commercial applications. Density can be a critical factor in battery electrode materials because of space limitations in battery cells. In a given space, a more dense material produces more energy than would a material of lower density such as the material disclosed in this prior art patent. Furthermore, the method disclosed in U.S. Pat. No. 4,250,005 is a batch method involving several steps and a substantial amount of time. The steps include first mixing manganese nitrate and bismuth nitrate in a solution and thereafter maintaining a low temperature by placing the solution in an ice bath. Sodium hydroxide is then added with continuous stirring while maintaining the constant low temperature of about 2 degrees Celsius. The resulting suspension is oxidized by bubbling oxygen through the mixture for about 22 hours. This method involves the requirement that the reactive materials be kept at a low temperature on the order of about 1 to 2 degrees Celsius during the reaction. Such low temperature requires continuous cooling which is typically not feasible for large scale commercial applications. Further, and in addition to its low density, the material produced may not be commercially feasible because of its high resistivity.

In another prior an approach, manganese dioxide is physically mixed with oxides of bismuth, lead or mixtures thereof. Wroblowa, et al., *Journal of Electroanalytical Chemistry,* 238, 93 (1987). An electrode made in accordance with this method and which included manganese dioxide doped with bismuth oxide was shown to be rechargeable up to 250 cycles, but with a continuous drop in capacity as the number of cycles increased. In addition, this physical mixing process is time consuming and may lead to non-homogeneous mixtures, thereby affecting the performance of the electrodes. Moreover, the electrodes prepared with physical mixing require several electrochemical cycles for activation and use. The resulting material is not suitable for sealed cells because of the problem of gas evolution in complete cells, as discussed hereinafter with respect to other prior art methods.

Another method is disclosed in U.S. Pat. No. 5,156,934, which is owned by the assignee of the present invention. In that patent, commercially available electrolytic manganese dioxide or commercially available chemical manganese dioxide is used. The particles of the prepared electrolytic or chemical manganese dioxide are coated with bismuth hydroxide or in another embodiment of the method, the particles are coated with lead hydroxide. The electrode prepared with the bismuth-coated product shows good rechargeability and sufficient density and conductivity for commercial application. However, the material prepared in accordance with this method does not appear to be useful in sealed battery cells. Typically, a zinc anode and commercially available separator materials would be used. When using separator materials, which are recommended for use in alkaline batteries with potassium hydroxide or a mixture of potassium hydroxide and potassium fluoride as the electrolyte, gassing has been found to occur. This gassing is due to a reaction which occurs involving the unreacted bismuth oxide or bismuth hydroxide in the cell. More specifically, a finite amount of the bismuth oxide or hydroxide is soluble in the alkaline electrolyte. The soluble bismuth species pass through the commercial separator to the anode compartment where it could deposit on the zinc electrode and then produce a gas. The gas can build up within the cell which presents an undesirable situation. Thus, the material prepared by the method disclosed is not ideal for use in sealed cells.

U.S. Pat. No. 5,156,934 also describes additional references which pertain generally to the use of manganese dioxide in battery cells. U.S. Pat. No. 5,156,934 is presently herein incorporated by reference in its entirety.

U.S. patent application Ser. No. 07/645,984, filed Jan. 21, 1991 (now allowed) which is owned by the assignee of the present invention, discloses a method of preparing a rechargeable modified manganese-containing electrode material by electrolytic deposition. This method involves simultaneous deposition of a charged product on one electrode and of a discharged product on the counter electrode used during electrolysis. The products can then be used as electrode materials in rechargeable cells. In contrast, the method of the present invention involves fewer variables to be controlled during preparation and a shorter preparation time which are relevant factors in many applications. Furthermore, as discussed fully herein, the material prepared in accordance with the present invention can be mixed with commercially available materials to create a rechargeable product. In such a case, only a fraction of the material must be produced as compared to the amount of the prior art material which would need to be produced to manufacture a given rechargeable product.

None of the aforementioned prior art methods and procedures have disclosed a battery electrode material which is highly rechargeable and which has suitable properties of density and conductivity while still being useable in a sealed battery cell and which can be used to prepare relatively large quantities of the material in a short time and at low cost. Although some prior art materials exhibit good rechargeability, the previously disclosed materials generally do not lend themselves to practical commercial application. There remains a need for a battery electrode material which meets the aforementioned criteria for commercial application. There also remains a need for a material which can be used with commercially available materials such as, for example, electrolytic manganese dioxide and chemical manganese dioxide, and which when added to such commercially available products, will impart rechargeability to the material as a whole. There also remains a need for a method of making a suitable compound which is feasible for large scale commercial production of rechargeable battery cells.

SUMMARY OF THE INVENTION

These and other needs are satisfied by the method and compound of the present invention which involves preparation and use of a rechargeable manganese-oxide based material. The material can be used by itself as a rechargeable battery electrode material or it can be added, in the proportions disclosed herein, to electrolytic manganese dioxide or chemical manganese dioxide to create an overall rechargeable electrode material. The material created by the method of the present invention is highly rechargeable.

The method consists of preparing an aqueous solution of manganese nitrate by mixing disclosed proportions of manganese nitrate and water to obtain a first solution. Thereafter, bismuth nitrate is to be dissolved in the first solution. This can be accomplished by first creating a second solution by dissolving bismuth nitrate in a solution of nitric acid. Alternatively, solid bismuth nitrate can be mixed in the first solution and thereafter nitric acid is added to dissolve the bismuth nitrate. It is preferable to heat the solution to facilitate dissolving the bismuth nitrate. Once the bismuth nitrate has been dissolved in the solution, then the overall mixture is heated to evaporate substantially all of the water in the mixture. Heating is continued at a temperature of between about 200 to 300 degrees Celsius until all of the nitrates in the reactive materials are decomposed into composite manganese-bismuth-oxide, oxides of nitrogen and oxygen. This is indicated when the brown vapors being emitted from the reactive materials cease. The mixture is continuously heated for between about 0.5 to 2.5 hours in order to remove gaseous by-products of the reaction and to dry and sinter the material.

The resulting compound has the formula $MnO_2 \cdot x \cdot Bi_2O_3$, where x varies from about 0.02 to 0.5, depending upon the amount of bismuth nitrate in the starting solution. The final compound is ground to the desired particle size and can be used as an electrode material or as a component thereof as further described hereinafter.

The process of the present invention provides a highly rechargeable compound which can be used alone as a rechargeable battery electrode material or can be added to electrolytic or chemical manganese dioxide to create a rechargeable battery electrode material. The associated cell has excellent rechargeability and does not exhibit a problem with gas build-up within the cell.

It is an object of the invention to provide a method of making a highly rechargeable battery electrode material which is useful in sealed battery cells of commercially available sizes.

It is another object of the invention to provide a method of making a compound which can be added to commercially available electrolytic manganese dioxide or chemical manganese dioxide to impart rechargeability to the material as a whole.

It is yet a further object of the invention to provide a method of making a rechargeable electrode material which method is simple and efficient, in that it is a one-step method and can be used on a full scale commercial basis.

It is another object of the invention to provide a material for use as a battery electrode which has excellent rechargeability and which retains its capacity over many charge-discharge cycles.

It is a further object of the invention to provide a rechargeable material which has good properties of density and conductivity for commercial applications.

A full understanding of the invention can be gained from the following description of the preferred embodiment when read in conjunction with the accompanying drawings in which:

DESCRIPTION OF THE PREFERRED EMBODIMENTS

This invention relates to a method of making a rechargeable battery electrode material. The material is a manganese oxide-based material which, when used in a sealed manganese-oxide/zinc cell, does not give rise to the problem of gas build-up as had been found with prior art materials. The disclosed procedure produces a homogeneous compound which is highly rechargeable and which can be used alone as an electrode material, with the appropriate binder and current collector. Alternatively, the material of the present invention can be added to commercially prepared electrolytic manganese dioxide or chemical manganese dioxide to create a rechargeable electrode material, whereas the commercially available electrolytic manganese dioxide or chemical manganese dioxide is not rechargeable. A relatively small amount of the disclosed material can impart rechargeability to previously non-rechargeable, ready-to-use materials. This simplifies production of rechargeable batteries and reduces costs of such production in that readily available materials can still be used and yet, with a simple modification such that the material of the present invention is added thereto, a rechargeable product can be manufactured whereas the prior product was a single use product.

More specifically, in accordance with the method of the present invention, an aqueous solution of manganese nitrate is prepared by mixing between about 50 and 150 grams, and preferably between about 58 and 60 grams, of manganese nitrate, with between about 10 and 40 milliliters (ml), and preferably between about 15 and 30 ml of water.

Thereafter, a second substance which includes bismuth nitrate is added to the first solution containing the manganese nitrate. It is presently preferred that the second substance include bismuth nitrate. However, lead nitrate could also be used while achieving similar results. In the case of bismuth nitrate, it is known that bismuth nitrate is not soluble in water, thus, the bismuth nitrate may be dissolved in a second solution which contains nitric acid and the second solution is then added to the first solution. More specifically, between about 5 and 100 grams of bismuth nitrate is combined with between about 6 and 100 milliliters of concentrated nitric acid to obtain a second component which is then added to the first solution. Alternatively, between about 5 and 100 grams of bismuth nitrate is added to the first solution and then the mixture is heated to a temperature of between about 60 and 70 degrees Celsius. Thereafter, between about 5 and 100 milliliters of concentrated nitric acid is added to the mixture to dissolve the bismuth nitrate. Examples of each of these procedures are set forth hereinafter.

The resulting mixture containing the dissolved bismuth nitrate is then heated to facilitate the evaporation of substantially all of the water in the mixture. Heating at a temperature of between about 200 to 300 degrees Celsius, and preferably between 200 and 250 degrees Celsius, is thereafter continued for preferably between about 0.5 to 2.5 hours while the nitrates contained in the mixture decompose into a mixed oxide of manganese and bismuth. Decomposition of the nitrates in the mixture is indicated when brown vapors being emitted from the materials stop. The resulting compound is maintained at a temperature of between about 200 and 300 degrees Celsius and, preferably between 200 and 250 degrees Celsius for, preferably, an additional 2 hours. The rechargeable compound so prepared is then allowed to cool at room temperature and may then be ground to the desired particle size.

It may also be preferred to bubble air or oxygen through the mixture during the heating period. This facilitates reaction of all of the materials and faster removal of gaseous by-products and better oxidation of the compounds.

The material prepared in accordance with the method of the present invention is then used as an electrode material. More specifically, in the battery cell, the material is typically mixed with an inactive component such as graphite which acts as an electrically conductive reinforcement agent to the material. The compound is mixed such that about 50 to 85 percent by weight of the compound is combined with between about 10 and 45 percent by weight of the conducting reinforcement component. Alternatives to graphite include acetylene black as well as metal fibers and metal powders including nickel, nickel plated iron and nickel plated copper. Preferably, the material is then mixed with between about 2 and 10 percent by weight of a binder such as tetrafluoroethylene (commonly known as TEFLON). This is now the cathode (or positive electrode) for a battery cell. The battery cell would also include a negative electrode in spaced relationship to the positive electrode, a separator placed between the positive and the negative electrode, a current collector contained in a battery housing and an electrical connection between the positive and the negative electrodes.

Figure 1:
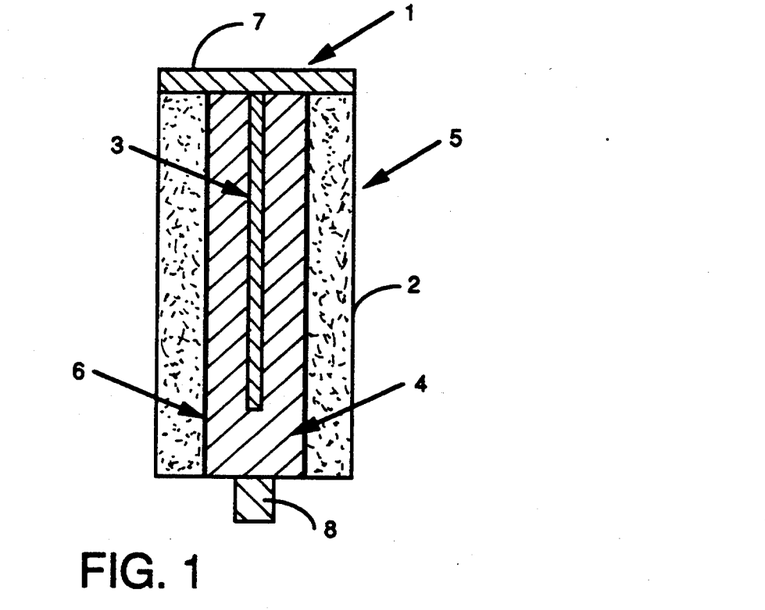
FIG. 1 is a schematic cross section of a battery cell incorporating the electrode material of the present invention.

One example of such a battery cell incorporating the material of the present invention is shown in FIG. 1. More specifically, FIG. 1 shows battery cell 1 which is of a cylindrical configuration commonly referred to as a bobbin type cell. The cell 1 has cylindrical metal enclosure portion 2. The innermost component of cell 2 is current collector 3, used to extract the electric energy generated through the chemical reaction in cell 2 as is well understood by those skilled in the art. Surrounding current collector 3 is anode compartment 4. It is presently preferred to use a zinc anode. Zinc anodes are commonly used in the battery industry, however, it should be understood that the present invention could readily be used with other types of anodes appropriate for the application. The outermost component contained within metal enclosure portion 2 of cell 1 is the cathode compartment 5. As described hereinbefore, the cathode material is composed of the rechargeable material prepared in accordance with the present invention which can be combined with a conducting reinforcement component, such as graphite and a binder, such as tetrafluoroethylene. The conducting reinforcement component and the binder are not shown as separate components in FIG. 1 as they are mixed with the material of the present invention to create a single cathode mix. In accordance with another embodiment of the invention, the material of the present invention can also be combined with commercially available electrolytic manganese dioxide or chemical manganese dioxide. In addition, an electrolyte, such as KOH, will be present in the cell (not visible in FIG. 1). This is discussed in detail hereinafter.

Referring again to FIG. 1, anode compartment 4 and cathode compartment 5 have separator 6 placed therebetween. Separator 6 allows the (OH)$^-$ ions to move from cathode compartment 5 to anode compartment 4 and vice versa, for the chemical reaction to take place between the anode and cathode materials which generate the electric current of the battery while maintaining those materials in physically separate compartments. In addition, the separator 6 resists migration of the discharged products of the reaction from crossing over into the opposing compartment.

Cell 1 is appropriately sealed by top portion 7 and bottom portion 8 for making contact within the circuit of the particular application as will be understood by those skilled in the art.

As noted hereinbefore, in accordance with another embodiment of the invention, the material prepared in the manner described hereinbefore is combined with commercially prepared electrolytic manganese dioxide, commercially prepared chemical manganese dioxide, or mixtures thereof, to create a rechargeable electrode material. In such a case the material of the present invention is added to the commercially prepared material such that the weight percentage of the compound in the final electrode material is between about 5 to 25 percent by weight. When the material prepared in accordance with the present invention is added to the commercially prepared materials, then such commercially prepared materials which were previously not rechargeable, can then be used in a rechargeable battery. This is a great convenience in the battery field because readily available materials can still be used and with a simple modification, a highly desirable product is obtained.

In order to further clarify and enhance the disclosure of the invention, several examples will be considered.

EXAMPLE I

In accordance with this embodiment of the invention, about 58 grams of manganese nitrate was dissolved in about 30 milliliters (ml) of water in a beaker to form a first solution. Separately, about 97 grams of bismuth nitrate was dissolved in about 100 ml of concentrated nitric acid at a temperature of between about 50 to 70 degrees Celsius to form a second solution. The second solution which contained the bismuth nitrate was added to the first solution containing manganese nitrate and the resulting liquid was stirred to achieve adequate mixing. The beaker was placed on a hot plate at a temperature of preferably about 200 degrees Celsius to evaporate substantially all of the water in the solution. Heating was continued in order to facilitate decomposition of the nitrates to form bismuth oxide mixed with manganese oxide having the formula $MnO_2 \cdot 0.5Bi_2O_3$. When all of the nitrates were decomposed which was indicated when the brown vapors being emitted from the beaker stopped, the beaker was transferred to an oven and heated at a temperature of about 250 degrees Celsius in order to remove the gaseous by-products, and to dry and sinter the material. The beaker was heated in the oven for preferably about two hours. It was thereafter removed and allowed to cool at room temperature. The solid, black material was removed and was ground to a desired particle size. It was thereafter tested as discussed further hereinafter with reference to the drawings.

EXAMPLE II

In accordance with another aspect of the invention, about 60 grams of manganese nitrate was dissolved in about 15 ml of water in a beaker. Thereafter, about 6 grams of bismuth nitrate was added to the solution. The solution was warmed to about 80 degrees Celsius and about 5 ml of concentrated nitric acid was added to dissolve the bismuth nitrate. The beaker was placed on a hot plate and heated at a temperature of about 200 degrees Celsius to evaporate substantially all of the water in the solution. Heating was continued in order to facilitate the decomposition of the nitrate in the manganese nitrate and the bismuth nitrate to form bismuth oxide mixed with manganese oxide having the formula $MnO_2 \cdot 0.3Bi_2O_3$. When substantially all of the nitrate was decomposed which, as stated in the previous example, was indicated when the brown vapors being emitted from the reactive substances stopped, the beaker was transferred to an oven and heated at a temperature of preferably about 250 degrees Celsius. The beaker was left in the oven at that temperature for preferably about two hours after which it was removed and cooled to room temperature. The resulting compound was removed, ground and tested as discussed more fully hereinafter with reference to the drawings.

EXAMPLE III

In accordance with this embodiment of the invention, about 60 grams of manganese nitrate was dissolved in about 20 ml of water in a conical flask. In a separate container, about 6 grams of bismuth nitrate was dissolved in about 10 ml of concentrated nitric acid at a temperature of preferably between about 50 and 70 degrees Celsius. The bismuth nitrate solution was added to the manganese nitrate solution and the liquid was stirred to achieve adequate mixing. The conical flask was fitted with a rubber stopper having two holes, one for gas to be bubbled through the solution, and the other as a gas outlet. The flask was placed in an oven which was maintained at a temperature of preferably about 200 degrees Celsius. Oxygen from a suitable source which would be available to those skilled in the art was bubbled through the solution. The heating of the solution facilitated evaporation of the water and decomposition of the nitrates as discussed hereinbefore with reference to the previous examples to form bismuth oxide-mixed manganese oxide. When the brown vapors from the decomposition of the nitrates stopped, the oven temperature was increased to preferably about 250 degrees Celsius. The flask was maintained at that temperature for preferably about two hours after which it was removed and allowed to cool to room temperature. The resulting compound was removed and tested.

EXAMPLE IV

A battery electrode was prepared using the compound prepared in accordance with the embodiment of the invention described in Example I. More specifically, about 5.0 grams of bismuth oxide-mixed manganese oxide prepared in accordance with Example I was ball milled with about 4.5 grams of LONZA graphite (KS 44), which is available to those skilled in the art from Lonza Incorporated of Fair Lawn, N.J., for preferably about 12 hours. Thereafter, about 0.5 grams of a dispersion of tetrafluoroethylene, commonly known as TEFLON, which is available to those skilled in the art from E.I. Du Pont de Nemours & Company of Wilmington, Dela., was added to the mixture and ball milled for about an additional three hours. About 1.0 gram of this cathode mix was pressed onto a 1"×1" piece of nickel gauze at about 10,000 psi. The resulting electrode was placed in a flat plexiglass cell with a nickel counter-electrode, an Hg/HgO reference electrode was used and Pellon paper was used as the separator. A solution of 9 Molar potassium hydroxide was used as the electrolyte.

Figure 2:
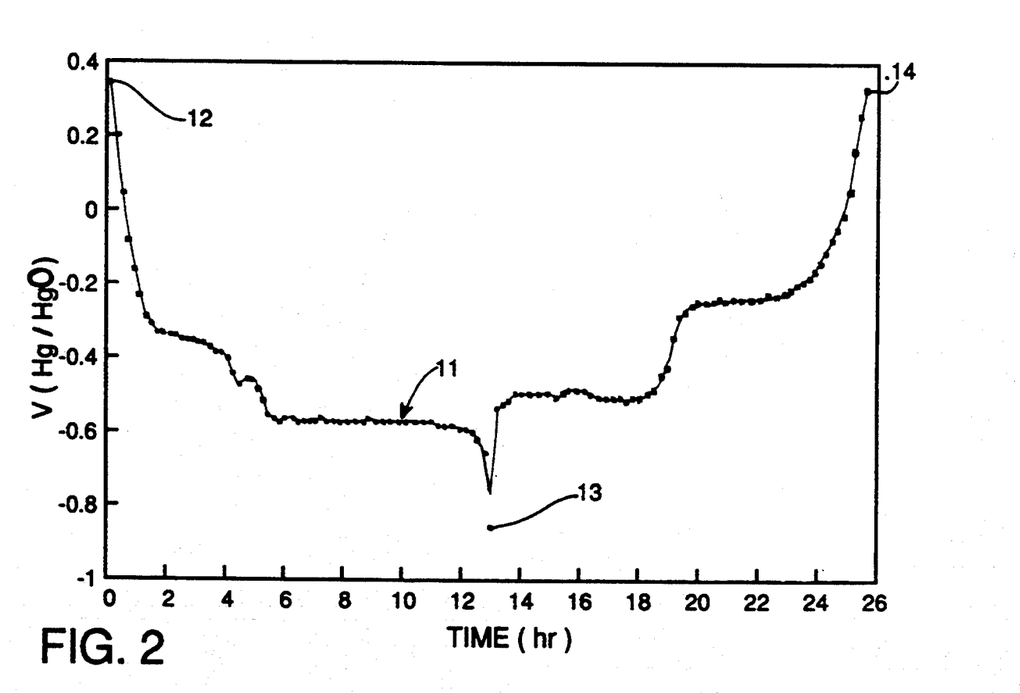
FIG. 2 is a typical charge-discharge cycle curve with voltage plotted along the ordinate and time along the abscissa for an electrode prepared in accordance with one embodiment of the present invention and using the material of the present invention alone as the active electrode material.

The results of cycling the electrode prepared in accordance with this aspect of the invention are shown in FIG. 2. FIG. 2 shows a typical charge and discharge cycle curve 11 for the electrode at constant current with voltage plotted along the ordinate and time along the abscissa.

In FIG. 2, as with the remaining charge-discharge curves herein, it should be understood that during the cycling process, the rate of discharge was equal to the rate of charge. For example, it can be chosen that the battery cell be discharged at one milliampere and the battery cell is discharged in 12 hours. On recharge, if the starting potential is reached in twelve hours again, then a full recharge capacity has been achieved. Referring to FIG. 2, it is noted that the time of discharge is generally equal to the charge time as shown in curve 11 in that the time elapsed between the starting point 12 to the discharge point 13 (about 12.5 hours) is substantially equal to the time between discharge point 13 and full recharge as designated by reference character 14 (about 12.5 hours). This indicates that during recharge of the battery cell, substantially all of the discharged capacity is recovered.

EXAMPLE V

Figure 3:
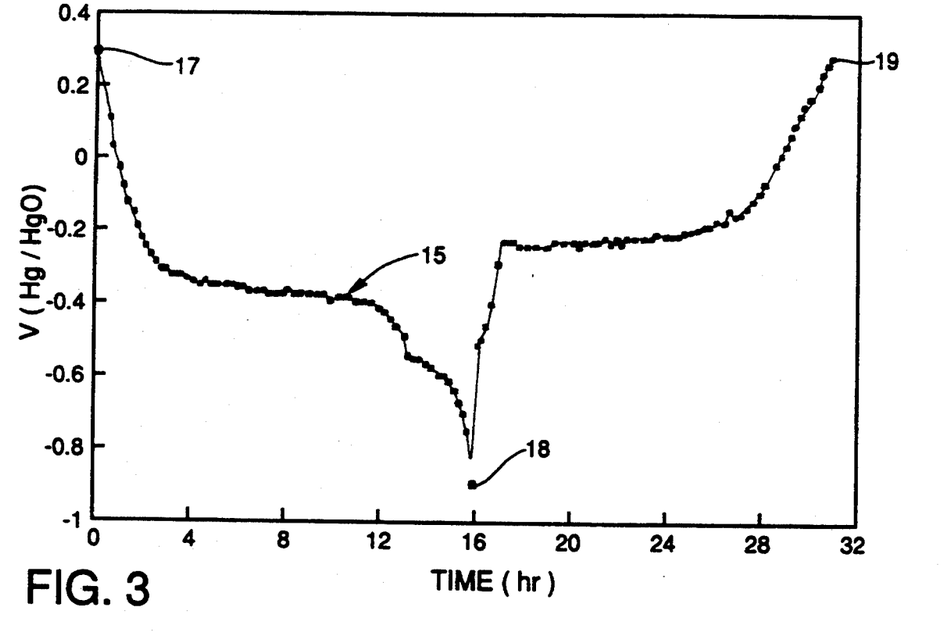
FIG. 3 is a typical charge-discharge curve such as that shown in FIG. 2 using an electrode prepared in accordance with another embodiment of the invention.

A battery cell was made using the material prepared in accordance with Example II hereof. More specifically, about 5.0 grams of the bismuth oxide-mixed manganese oxide prepared in accordance with Example II was ball milled with about 4.5 grams of LONZA graphite (KS 44) for preferably about 12 hours. Then, about 5.0 grams of a TEFLON dispersion was added to the mixture and was ball milled for preferably an additional three hours. About 1.0 grams of this cathode mix was pressed onto a 1"×1" piece of nickel gauze at a pressure of preferably about 10,000 psi. A battery cell was prepared using the same reference electrode, separator and additional components as set forth in Example IV hereof. The results are shown in FIG. 3. FIG. 3 is a typical charge-discharge curve 15 for the electrode with voltage plotted along the ordinate and time along the abscissa. Comparison of the discharge and charge time, at the same current, indicates that the full discharge capacity is recovered using the electrode prepared in accordance with this aspect of the invention as is evident upon a comparison of the discharge and charge time shown between the points designated by reference characters 17 and 18 and between the points designated by reference characters 18 and 19, respectively.

EXAMPLE VI

A battery cell was made using the material prepared in accordance with the embodiment of the invention set forth in Example III hereof. More specifically, about 5.0 grams of bismuth oxide-mixed manganese oxide prepared in accordance with Example III was ball milled with about 4.5 grams of LONZA graphite CKS 44) for preferably about 12 hours. Thereafter, about 0.5 grams of a TEFLON dispersion was added to the mixture and ball milled for preferably about three hours. About 1.0 gram of this mixture was pressed onto a 1"×1" piece of nickel gauze at a pressure of preferably about 10,000 psi to create a positive electrode. This electrode (cathode) was used in a battery cell having the additional components stated in Example IV hereof.

Figure 4:
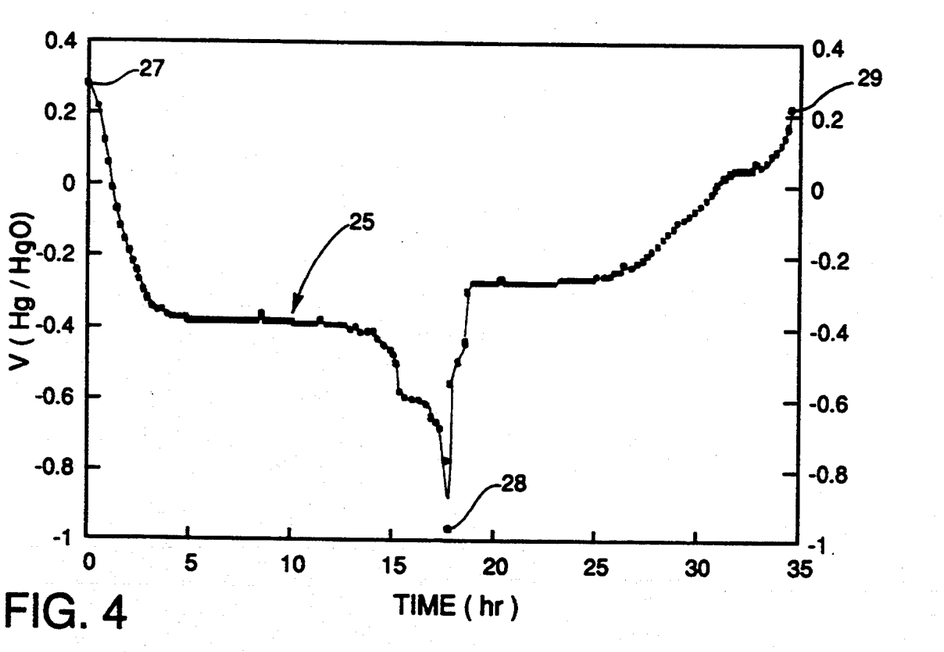
FIG. 4 is a typical charge-discharge curve such as that shown in FIG. 2 using an electrode prepared in accordance with yet another embodiment of the invention and in which the inventive material alone is used as the active electrode material.

The results of cycling the battery are shown in FIG. 4 which is a typical charge and discharge curve 25 with voltage plotted along the ordinate and time along the abscissa. As was found with the other two embodiments of the invention which were discussed with reference to FIGS. 2 and 3, the curve 25 of FIG. 4 indicates that the electrode prepared in accordance with this aspect of the invention has excellent cycling properties. All of the discharge capacity is recovered as is evident upon a comparison of the discharge and charge time shown between the points designated by reference characters 27 and 28 and between the points designated by reference characters 28 and 29 which is the re-charge portion of curve 25 in FIG. 4.

EXAMPLE VII

Figure 5:
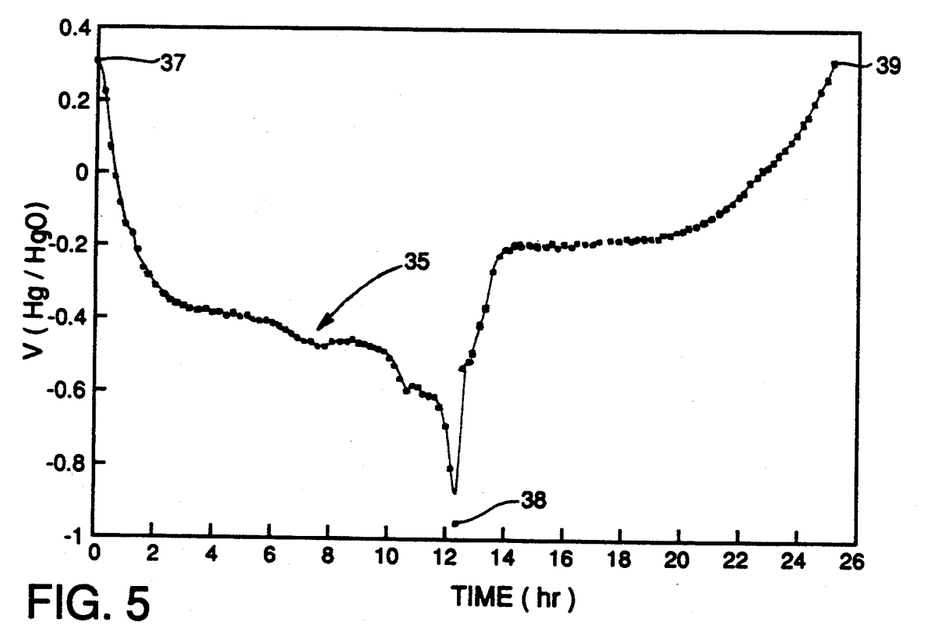
FIG. 5 is a typical charge-discharge curve such as that shown in FIG. 2 using the rechargeable material prepared in accordance with the method of the present invention combined with commercially prepared electrolytic manganese dioxide to create a rechargeable electrode.

As stated hereinbefore, the material of the present invention may be used by itself as an electrode material, or it may be combined with commercially available materials to thereby obtain an electrode which is rechargeable. To illustrate this latter aspect of the invention, about 2.0 grams of the bismuth oxide-mixed manganese oxide prepared in accordance with Example I hereof was ball milled with about 8.0 grams of commercially prepared electrolytic manganese dioxide for about 15 minutes. Then, about 5.0 grams of this mixture was ball milled with about 4.5 grams of LONZA graphite CKS 44) for preferably about 12 hours. Then, about 0.5 grams of TEFLON dispersion was added to the mixture and ball milled for another three hours. Thereafter about 1.0 grams of this cathode mix was pressed onto a 1"×1" piece of nickel gauze at a pressure of preferably about 10,000 psi. The resulting electrode was tested in a battery cell having the additional components set forth in Example IV hereof. The results are shown in FIG. 5. FIG. 5 is a typical charge and discharge cycle curve 35 for the electrode prepared in accordance with this embodiment of the invention with voltage plotted along the ordinate and time along the abscissa. As with the electrode in which only the material of the present invention is used, the electrode composed of a combination of the inventive material and previously known materials showed excellent cycling properties. The full discharge capacity was recovered on charging as indicated by a comparison of the time of discharge as shown between points 37 and 38, and the time of recharge as shown between points 38 and 39. The times are generally equivalent.

Figure 6:
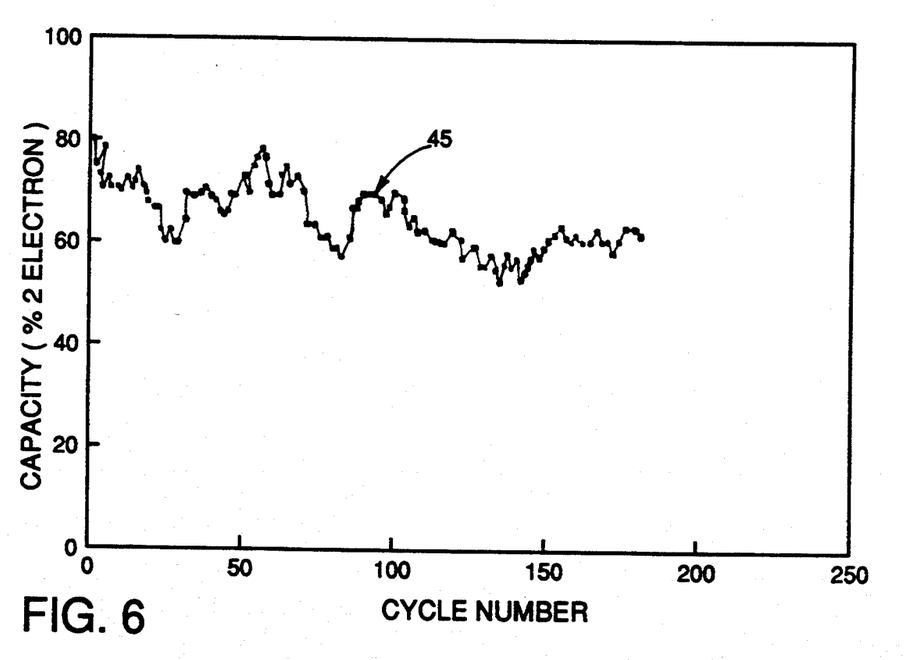
FIG. 6 is a discharge capacity curve for the electrode of FIG. 4 with the percentage of the theoretical two-electron capacity plotted along the ordinate and the cycle number along the abscissa of the graph.

FIG. 6 shows curve 45 which indicates capacity as a function of cycle number for the electrode prepared in accordance with Example VI hereof. As will be understood by those skilled in the art, capacity may be measured as a percentage of the theoretical two-electron capacity of the material being tested. The theoretical two-electron capacity relates to the charge involved when the manganese in the battery electrode is transferred from a valence state of 4+ to 2+. Two electrons are transferred in the reaction. Capacity is measured as a percentage of a theoretical two-electron capacity as will be understood by those skilled in the art. It is noted that curve 45 indicates only a relatively small decrease in capacity, measured as a percentage of the theoretical two-electron capacity, over approximately 200 cycles. This means that the materials of the present invention provide the property of excellent rechargeability to previously non-rechargeable products.

EXAMPLE VIII

As noted hereinbefore, one difficulty with prior art materials has been found to be that of gas build-up in a battery cell. This build-up is believed to be the result of unreacted bismuth oxide dissolving in an alkaline electrolyte passing through the separator to the zinc compartment and depositing on the zinc anode. The material prepared in accordance with the present invention was tested and compared with a prior art material to determine the amount of bismuth which would dissolve in alkaline solution. More specifically, about 20 grams of the material prepared in accordance with the method of Example I was stirred in about 100 ml of 9M KOH for about 15 minutes. The solution was then allowed to stand for about 12 hours. The clear solution was then decanted off and was tested for the presence of bismuth using a rotating disc electrode, as would be understood by one skilled in the art. The same experiment was performed using the material prepared in accordance with the method disclosed in U.S. Pat. No. 5,156,934.

Figure 7:
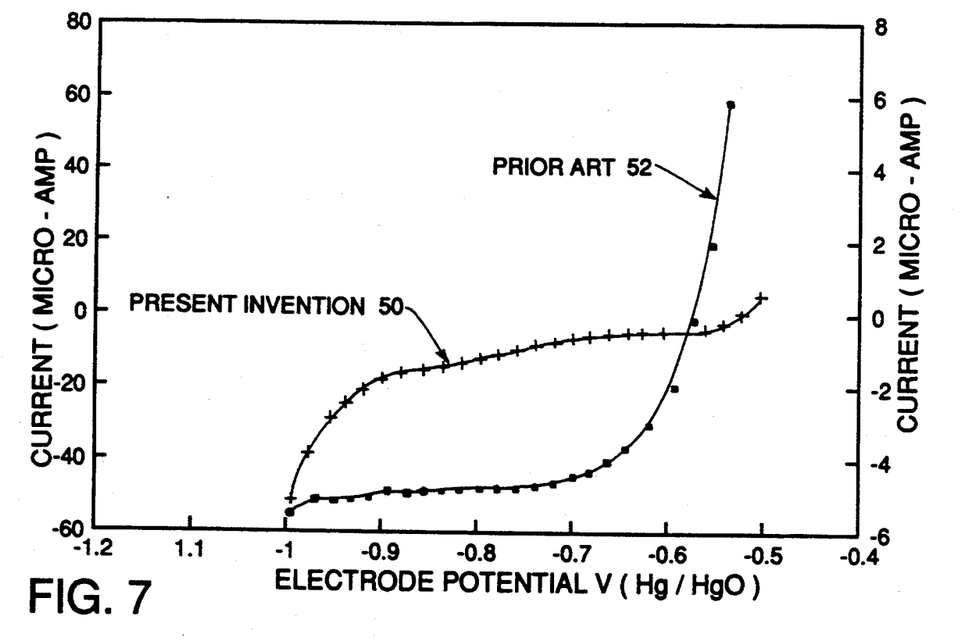
FIG. 7 is a comparison of two curves with electrode potential in volts of a gold rotating disc electrode along the abscissa and current in micro-amperes along the ordinate; the curves indicate the presence of bismuth in reacted material prepared in accordance with the present invention and material prepared in accordance with the prior art.

The results of this test are shown in FIG. 7 which is a graph of current plotted along the ordinate against electrode potential of a gold rotating disc electrode along the abscissa. Curve 50 of FIG. 7 shows the current measured in the solution created using the material prepared in accordance with the present invention. Curve 52 shows the current as a function of electrode potential for the prior art material. As shown in FIG. 7, the current for the prior art material is higher at potentials of $-0.7$ to $-0.9$ volts as compared to the curve 50 for the material of the present invention.

The magnitude of the current in the $-0.7$ to $-0.9$ volt region for both curve 50 and 52 is proportional to the amount of dissolved species. The current of curve 50 is about fifty times smaller than that of curve 52. Accordingly, the amount of bismuth dissolved from the material of the present invention is about 50 times less than that from the prior art material. This is advantageous, as noted hereinbefore, because the dissolved bismuth is believed to result in gas build-up within the cell. Thus, the material of the present invention is preferable for use in sealed cells whereas the prior art materials are generally not useful in sealed cells.

EXAMPLE IX

The problem of gassing in the cell was further investigated using C-size cells. The cells were fabricated in the bobbin configuration, as would be understood by one skilled in the art, using a cathode mix containing about 80% active material, about 15% LONZA graphite (KS 44) and about 5% TEFLON dispersion. Two layers of ZAMM-1, which is available to those skilled in the art from RAI Corp. of Long Island, New York, were used as a separator with 9M KOH as the electrolyte. The anode was made using about 93% zinc with about 3% zinc oxide, about 2% lead oxide and about 2% sodium-carboxymethyl cellulose. The cells were not sealed. They were placed inside conical flasks maintained at a temperature of about 25 degrees Celsius. The flasks were sealed with a rubber stopper having a graduated burette. The amount of gas produced was determined from the movement of the water level in the burette.

Figure 8:
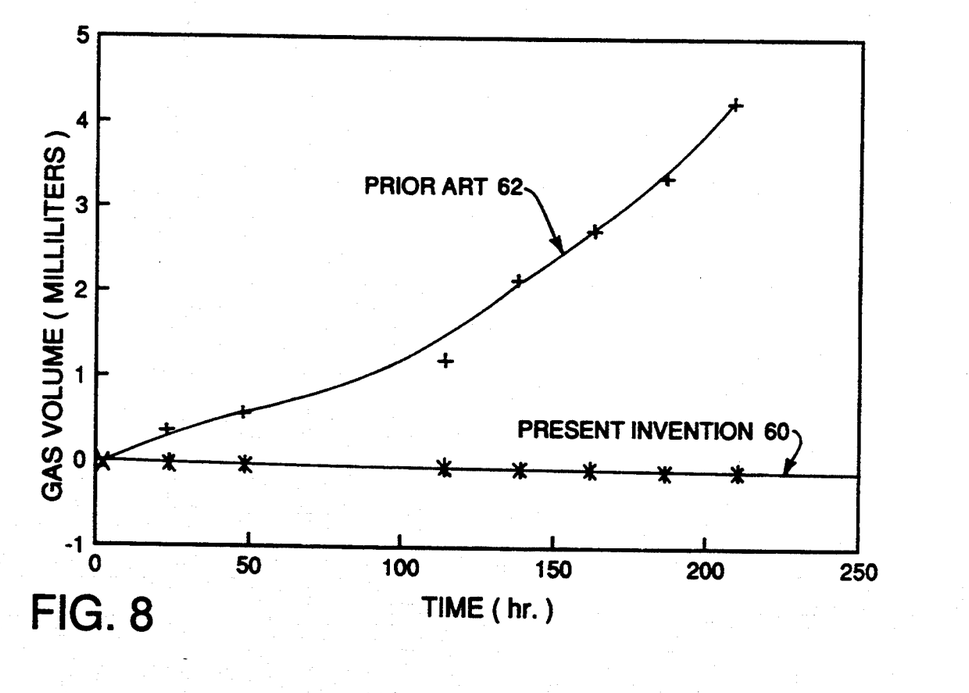
FIG. 8 is a comparison of two curves with gas volume in milliliters plotted along the ordinate against time in hours along the abscissa. The curves indicate the presence of gas emitted by prior art electrode materials as compared with the electrode material prepared in accordance with the present invention.

The results are shown in FIG. 8 which is a graph of volume of gas as a function of time. Curve 60 which is essentially a straight line shows the results of the test for the cell containing the material prepared in accordance with the embodiment of the present invention set forth in Example VII hereof. Curve 62 shows the results of the test for a material prepared in accordance with U.S. Pat. No. 5,156,934 which was discussed hereinbefore. As can be observed from FIG. 8, virtually no gas was detected, as indicated by straight line 60, for the electrode containing the material of the present invention. However, the prior art material as indicated in curve 62 did exhibit a gas build-up.

It will be appreciated by those skilled in the art that the present invention provides a highly rechargeable product which has high density and as such it leads to higher battery capacities in a fixed volume cell. In addition, the material has higher conductivity than many prior art materials. Thus, a smaller amount of conducting matrix is required to make the electrode function in a given manner. This means that a greater amount of the active material can be placed into a battery cell which also leads to a higher capacity. The method is simple and is easily adaptable for large scale commercial production.

As discussed in detail hereinbefore, the material of the present invention also does not exhibit the problem of gas build-up during the reaction. This is because the inventive material includes bismuth oxide and manganese oxide which form a "mixed" oxide. This is contrasted with the unreacted mixture which is found in several of the prior art materials. With the material of the present invention, the bismuth oxide is substantially completely reacted with the manganese oxide, and thus, there is no unreacted bismuth oxide left to dissolve in the alkaline electrolyte. As shown in the aforementioned example, there is essentially no gas evolved when the material of the present invention is used in an electrode.

Furthermore, the material of the present invention can be used by itself as the active material in the cathode. Alternatively, it can be mixed with commercially prepared materials to impart immediate rechargeability to those materials. In addition, only a relatively small amount of the inventive material is required to be mixed with the commercially prepared materials to achieve this rechargeability.

Whereas, particular embodiments of the invention have been described for purposes of illustration, it will be appreciated by those skilled in the art that numerous variations of the details may be made without departing from the invention as described in the appended claims.

What is claimed is:

1. A method of making a rechargeable battery electrode material containing manganese oxide, including the steps of
preparing a first solution by mixing between about 50 to 150 grams of manganese nitrate with between about 10 and 40 milliliters of water,
adding a second component containing a nitrate to said first solution to create a mixture,
heating said mixture to evaporate substantially all water contained in said mixture,
continuing said heating of said mixture at a temperature of between about 200 and 300 degrees Celsius to establish decomposition of nitrates in said mixture and further continuing said heating until visible vapors generated by said decomposition of said nitrates substantially cease such that a compound containing manganese oxide is formed, and
maintaining said compound at a temperature of between about 200 and 300 degrees Celsius for a time period of between about 0.5 and 2.5 hours.

2. The method of claim 1 including
employing bismuth nitrate as said second component, and
dissolving said bismuth nitrate in said first solution, such that said compound formed upon said decomposition of said nitrates has the formula $MnO_2 \cdot x Bi_2O_3$, with x being about 0.02 to 0.5.

3. The method of claim 2 including
dissolving said bismuth nitrate in said first solution by dissolving between about 5 and 100 grams of bismuth nitrate in between about 6 and 100 milliliters of concentrated nitric acid to obtain said second component and adding said second component to said first solution.

4. The method of claim 2 including
dissolving said bismuth nitrate in said first solution by adding between about 5 and 100 grams of bismuth nitrate to said first solution, and effecting said evaporation by heating said first solution and said bismuth nitrate to a temperature of between about 60 and 70 degrees Celsius, and adding to said first solution between about 5 and 100 milliliters of concentrated nitric acid to dissolve said bismuth nitrate.

5. The method of claim 2 including
bubbling oxygen through said mixture while heating said mixture to evaporate substantially all water in said mixture and establishing said decomposition of said nitrates.

6. The method of claim 1 including
terminating said heating after said time period and grinding said compound into particles.

7. The method of claim 6 including
facilitating cooling of said compound to room temperature before grinding said compound.

8. The method of claim 6 including
adding electrolytic manganese dioxide to said compound to make said rechargeable battery electrode material in an amount such that the weight percentage of said compound in said battery electrode material is between about 5 and 25 percent by weight.

9. The method of claim 8 including
ball milling said compound with said electrolytic manganese dioxide after terminating said heating.

10. The method of claim 6 including
adding chemical manganese dioxide to said compound to make said rechargeable electrode material in an amount such that the weight percentage of said compound in said battery electrode material is between about 5 to 25 percent by weight.

11. The method of claim 10 including
ball milling said compound with said chemical manganese dioxide after terminating said heating.

12. The method of claim 1 including
preparing said first solution by employing between about 58 and 60 grams of manganese nitrate and mixing said manganese nitrate with between about 15 and 30 milliliters of water.

13. A method of making a rechargeable battery electrode including the steps of
preparing a first solution by mixing between about 50 and 150 grams of manganese nitrate with between about 10 and 40 milliliters of water,
adding a second component containing bismuth nitrate to said first solution,
dissolving said bismuth nitrate in said first solution,
heating said mixture to evaporate substantially all water in said mixture,
further heating said mixture at a temperature of between about 200 and 300 degrees Celsius to establish decomposition of nitrates in said mixture and continuing said heating until visible vapors generated by said decomposition of said nitrates substantially cease such that a compound is formed having the formula $MnO_2 \cdot x Bi_2O_3$, with x being about 0.002 to 0.5,
maintaining said compound at a temperature of between about 200 and 300 degrees Celsius for a time period of between about 0.5 and 2.5 hours, and
mixing said compound with an electrically conducting reinforcement component.

14. The method of claim 13 including
ball milling said compound and said electrically conducting reinforcement component for enhancing the efficiency of mixing,
adding a binder to said compound and reinforcement component, and
ball milling said compound including said reinforcement component and said binder for an additional time period to create a positive electrode.

15. The method of claim 14 including
mixing about 50 and 85 percent by weight of said compound with about 10 and 45 percent by weight of said reinforcement component and with between about 2 and 10 percent by weight of said binder.

16. The method of claim 15 including
selecting said reinforcement component from the group consisting of graphite, acetylene black, metal fibers, and metal powders including nickel, nickel plated iron and nickel plated copper.

17. The method of claim 16 including
employing tetrafluoroethylene as said binder.

18. The method of claim 16 including
adding electrolytic manganese dioxide to said compound prior to said ball milling with said reinforcement component in an amount such that the weight percentage of said compound in said electrode is between about 5 to 25 percent by weight.

19. The method of claim 16 including adding chemical manganese dioxide to said compound prior to said ball milling with said reinforcement component in an amount such that the weight percentage of said compound in said electrode is between about 5 to 25 percent by weight.

20. The method of claim 16 including
adding a mixture of electrolytic manganese dioxide and chemical manganese dioxide to said compound prior to said ball milling with said reinforcement component in an amount such that the weight percentage of said compound in said electrode is between about 5 to 25 percent by weight.

21. A rechargeable battery cell comprising
a battery housing,
a positive electrode containing a rechargeable compound including manganese oxide and bismuth oxide formed of manganese nitrate reacted with bismuth nitrate in solution and said compound having the formula $MnO_2 \cdot xBi_2O_3$, with x being about 0.02 to 0.5, and said positive electrode also including an electrically conducting reinforcement component and a binder,
a negative electrode disposed within said housing in spaced relationship to said positive electrode,
a separator disposed between said positive electrode and said negative electrode,
a current collector contained within said housing, and
an electrolyte.

22. The battery cell of claim 21
wherein said positive electrode is composed of said compound mixed with electrolytic manganese dioxide in an amount such that the weight percentage of said compound in said positive electrode is between about 5 to 25 percent by weight.

23. The battery cell of claim 21
wherein said positive electrode is composed of said compound mixed with chemical manganese dioxide in an amount such that the weight percentage of said compound in said positive electrode is between about 5 to 25 percent by weight.

24. The battery cell of claim 21
wherein said positive electrode is composed of a mixture of said compound, electrolytic manganese dioxide and chemical manganese dioxide such that the weight percentage of said compound in said positive electrode is between about 5 to 25 percent by weight.

* * * * *